United States Patent Office 3,428,604
Patented Feb. 18, 1969

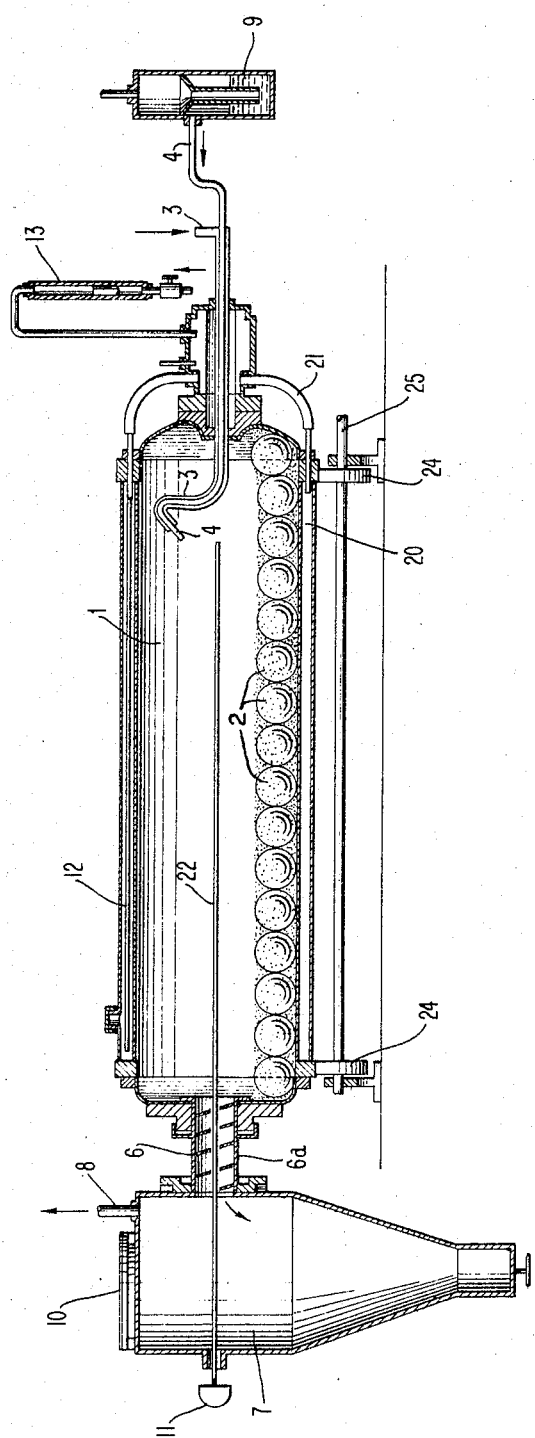

3,428,604
GAS PHASE MANUFACTURE OF
POLYFORMALDEHYDE
Henri Jean, Berthaud a Palaiseau, and Claude Thibault, Saint-Mande, France, assignors to Compagnie de Saint-Gobain, Neuilly-sur-Seine, France
Filed Oct. 6, 1960, Ser. No. 60,956
Claims priority, application France, June 14, 1960, 829,971
U.S. Cl. 260—67                  6 Claims
Int. Cl. C08f 3/40

This invention relates to the manufacture of polyformaldehyde.

The polymerization of formaldehyde has had several stages of development, the polymerization of the pure monomer in liquid phase at about −80° C., the polymerization in solution using a catalyst or not at atmospheric temperature, in one form of which gaseous formaldehyde was bubbled through the liquid reaction mass, and (French Patent 1,211,002) the gas phase polymerization in the presence of a catalyst such as a tertiary amine in vapor or aerosol state. The liquid phase systems required filtration and purification, and all systems need improvement in yield and rate of reaction.

It is an object of the invention to improve the efficiency of the gas phase polymerization of formaldehyde described in the French patent.

Another object is to improve the yield.

Another object is to supply superior machinery for the process.

Another object is to prevent the adherence of the new polymer to the walls of the reaction vessel in which the polymerization occurs.

Other objects will become apparent as the description proceeds.

The objects of the invention are accomplished, generally speaking, by a method of polymerizing formaldehyde that comprises bringing gas phase formaldehyde, and a vapor comprising a catalyst for the polymerization of formaldehyde in catalytic quantity, into contact with a moving bed comprising polyformaldehyde grains. In carrying out the process practically, the polymerization reaction is carried out in a closed vessel equipped with inlet and outlet to make the process continuous, a portion of the depth of which is filled with finely divided polyformaldehyde which is maintained in continuous motion so that the grains are continuously moving with respect to each other. The formaldehyde in gas phase and the catalyst in vapor form, either in gas or aerosol, are brought into contact with the agitated mass of powdered polymer on the surface of which the polymerization takes place. The volume of the reaction space, the chamber in which the reaction occurs is filed in a preferred form of the invention so that $\frac{1}{10}$ to $\frac{1}{4}$ of its volume is filled with polyformaldehyde. This powder offers a very large surface of contact on which the majority of polymerization takes place and on which its rate of polymerization is substantially accelerated. The output of the vessel is accordingly materially increased. The continuous motion in which the grains of powder are kept has several advantageous results, it frees the grains from continuous contact with each other, offers a continuously new surface to the polymerization reaction, and allows the gaseous reactants to penetrate deeply into the mass.

One of the difficulties of prior art practice arose from the adherence of the new polymer to the walls of the reaction vessel. The new process covers that wall with a fine film of powder of polymer which is perpetually renewed and which is not, or is much less, adherent so that the difficulty of removal which was previously experienced is no longer considerable. The polymer formed from the monomer arriving in the reactor does not deposit itself directly on the wall but on the powderous film and thus adheres no longer to the walls of the reaction vessel. This discovery makes it possible to establish a continuous process of manufacturing the polymer, the excess above a certain level being continuously withdrawn as additional monomer is admitted.

The catalysts for the polymerization are the same which have been previously used in the gas phase polymerization of formaldehyde and particularly those cited in the identified French patent, particularly the tertiary amines such as trimethylamine, triethylamine, tripropylamine, tributylamine, trihexylamine, dimethyloctadecylamine, cyclohexyldibutylamine, cyclohexyldiethylamine. They are utilized in proportions with respect to the formaldehyde on the order of 1 to 15 molecules of amine for each 3000 molecules of monomer. The amines are used in the pure state, preferably being gaseous for the lighter, and as aerosol for the heavier. The vapors of the gaseous amine can be entrained by passing nitrogen gas through a bubbler containing the amines in liquid form. When an aerosol is used it can be obtained by dispersing a liquid amine catalyst in the atmosphere of the reactor by means of atomizers. Any method of forming an aerosol is acceptable so long as the carrier gas is inert to the reaction.

A novel apparatus has been designed to carry out the reaction as set forth in the attached drawing in which the single figure is a diagrammatical, vertical section through the apparatus. The reactor 1 includes a horizontal cylinder closed at both ends of which the length is equal to several times the diameter. It is equipped with a double envelope 20 which may be supplied with heating or cooling fluid through an inlet pipe 12 and an outlet 21. A rotameter 13 is connected to the pipes 12, 21 and controls the circulation of the heating and cooling medium. The temperature of the reaction is measured by means of a rod 22 containing a pyrometer, the reading of which is indicated at 11. This reactor is mounted on rollers 24 which are driven by a shaft 25 and keep the cylinder 1 in continual rotation. The interior wall of the cylinder is completely smooth and is supplied with balls 2 which preferably extend from one end to the other and are of a diameter of $\frac{1}{10}$ to $\frac{1}{4}$ to that of the cylinder. By means of these balls, which roll along the cylinder wall through the powder as the cylinder turns, the powder is kept in continuous particulate motion. This state of motion is called fluidified. An inlet 3 is provided through the axis of the cylinder at one end for the formaldehyde monomer 3. Another inlet 4 coaxial with 3 is provided for the catalyst vapor which comes from bubbler 9.

This apparatus thus provides for the maintenance of the reaction vessel at any chosen temperature. The reaction proceeds well between −80° and +80° C., but a preferred range is between −50 and +50° C. The apparatus also provides for the continuous supply of polymer at the end of the cylinder opposite the inlet and is supplied with discharge pipe 6a equipped internally with a helical conveyor 6 which discharges into a separator 7 in which the polymer falls to the bottom and the gases escaping pass outward through a pipe 8 for recovery or reuse of any valuable constituents. The continuous agitation of the powder makes its discharge through the pipe 6a easy. The most satisfactory pressure for the reaction is atmospheric but higher or lower pressures can be used to control the state of the monomer. The monomer should not be liquid under the conditions of operation as this leads to a relatively uncontrolled reaction which may even become explosive in the presence of the catalyst. On the other hand to reduce the pressure substantially below atmospheric reduces the rate of polymerization.

The polymers obtained by the process are high polymers which have physical and mechanical properties which permit them to be shaped. The usual methods ap-

EXAMPLE 1

One uses a reactor of the type described but without means for continuously discharging the polymer, made of stainless steel and having a capacity of 30 l., a diameter of 28 cm. and a length of 55 cm. carrying 20 stainless steel balls having 60 mm. diameter and at a speed of rotation of two turns per minute. A flow of pure gaseous monomer containing 10% nitrogen by volume was introduced at a rate of 310 grams per hour, and the catalyst, triethylamine was introduced at a rate of 400 mg. per hour as a vapor carried in a current of nitrogen at 5 l. per hour. Temperature and pressure were atmospheric, 1200 grams of polyformaldehyde powder was distributed along the bottom of the cylinder before the monomer was admitted and the polymerization was carried out as the gaseous reactants were blown upon the surface of this bed through the nozzles 3, 4. The polymerization was very rapid and the gases were evacuated continuously from the other end of the cylinder but without removing the powder continuously. The temperature was kept at 30° C. by water circulation. At the end of the operation 2400 grams of polymer were present as powder in the bottom of the reaction space and none adhered to the wall of the cylinder. This corresponded to a yield of polymer better than 95% of what is theoretically possible and a production rate of 300 grams per hour of polymer. The characteristics of the polymer were inherent viscosity 1.5 as defined by Cragg J. Coll. Sci., vol. 1, pages 261 to 269, 1946, measured at a concentration of 0.5% at 60° in parachlorophenol containing 2% by weight of alphapinene. The speed of thermal decomposition at 222° C. was 3.5% per minute of the residual mass. The product was molded at 215° C. at 160 kg./cm.$^2$ in films 0.15 mm. thick which could be bent more than 10 times in the same place without breaking.

EXAMPLE 2

In a continuous reactor having a volume of 80 l. as described hereinabove, provided with means for automatically discharging polymers above a certain level in the reactor, a diameter of 292 mm. and length of 1200 mm., containing 16 balls 80 mm. in diameter and 50 balls 50 mm. in diameter rotated at 12 turns per minute, pure gaseous formaldehyde containing 10% nitrogen was introduced at a rate of 360 grams per hour, triethylamine was used as a catalyst at a rate of 0.4 gram per hour by a blown current of nitrogen. Operation was continued for 12 hours over a bed of 15 l. (4,500 kg.) of powdered polymer placed in the reactor before the monomer was admitted.

The reactor temperature measured by the pyrometer was regulated by water circulation not to exceed 32° C. At the end of the operation a total of 8.8 kg. at a yield of 99% was obtained. The nitrogen exhausted from the discharge end contained only traces of formaldehyde. The stainless steel walls had no traces of adherent polymer. The inherent viscosity of the polymer was 1.935, the speed of thermal decomposition at 222° C. was 7% per minute of the residual mass.

As many apparently widely different embodiments of the present invention may be made without departing from the spirit and scope thereof, it is to be understood that the invention is not limited to the specific embodiments.

What is claimed is:
1. A method of polymerizing formaldehyde in the absence of a liquid medium that comprises filling a reaction space from 1/10 to 1/4 full of grains of finely divided polyformaldehyde, maintaining the grains in constant motion with respect to one another, bringing gas phase formaldehyde into the reaction space and into contact with the grains in admixture with a vapor comprising a tertiary amine catalyst for formaldehyde polymerization in a proportion of 1–15 moles of amine for 3000 moles of monomer at a temperature between −80 and +80° C.

2. A method of polymerizing formaldehyde in the absence of a liquid medium that comprises filling a reaction space less than half full of grains of finely divided polyformaldehyde, maintaining the grains in constant motion, and bringing gas phase formaldehyde and a vapor comprising a tertiary amine in catalytic quantity into contact with the moving grains at a temperature between −50 and +50° C.

3. A method of polymerizing formaldehyde in the absence of a liquid medium that comprises bringing gas phase formaldehyde, and a vapor comprising a catalyst for the polymerization of formaldehyde in catalytic quantity, into contact with a moving bed comprising polyformaldehyde grains.

4. A method of polymerizing formaldehyde in the absence of a liquid medium that comprises bringing gas phase formaldehyde, and a vapor comprising a catalyst for the polymerization of formaldehyde in catalytic quantity, into contact with solid, fluidified, finely divided polyformaldehyde.

5. The method of starting the polymerization of formaldehyde in the presence of a catalyst for the polymerization that comprises bringing the catalyst and the formaldehyde together on the surface of a prepared bed of finely divided polyformaldehyde at a temperature favorable to the polymerization in the absence of a liquid medium.

6. A method of making polyformaldehyde that comprises forming a bed of polyformaldehyde grains in a reaction enclosure, polymerizing formaldehyde gas on the surface of the grains in the absence of a liquid medium and in the presence of a catalyst for polymerization in catalytically effective amount, and removing polymer from the enclosure as polyformaldehyde forms, thereby maintaining free space in the enclosure.

References Cited
UNITED STATES PATENTS 2,479,360   8/1949   Howard _____ 260—95

FOREIGN PATENTS 748,836   5/1956   Great Britain.

WILLIAM H. SHORT, *Primary Examiner.*

L. M. PHYNES, *Assistant Examiner.*

U.S. Cl. X.R.

260—95